(12) United States Patent
Satou et al.

(10) Patent No.: US 8,471,926 B2
(45) Date of Patent: Jun. 25, 2013

(54) IMAGING APPARATUS, INFORMATION PROCESSING APPARATUS AND INFORMATION PROCESSING METHOD

(75) Inventors: Ayako Satou, Osaka (JP); Senichi Onoda, Osaka (JP)

(73) Assignee: Panasonic Corporation, Osaka (JP)

( * ) Notice: Subject to any disclaimer, the term of this patent is extended or adjusted under 35 U.S.C. 154(b) by 136 days.

(21) Appl. No.: 12/840,521

(22) Filed: Jul. 21, 2010

(65) Prior Publication Data

US 2011/0019010 A1    Jan. 27, 2011

(30) Foreign Application Priority Data

Jul. 22, 2009    (JP) ................................. 2009-170938

(51) Int. Cl.
*H04N 5/76*    (2006.01)
*H04N 5/225*    (2006.01)

(52) U.S. Cl.
USPC ..................................... 348/231.2; 348/220.1

(58) Field of Classification Search
USPC .................... 348/231.99, 231.1, 231.2, 231.3, 348/231.4, 231.5, 231.7, 231.8, 231.9, 207.1, 348/220.1
See application file for complete search history.

(56) References Cited

U.S. PATENT DOCUMENTS

| 5,162,915 | A  | * | 11/1992 | Idera et al. | ..................... 348/239 |
| 6,122,411 | A  | * | 9/2000  | Shen et al. | ..................... 382/299 |
| 7,035,976 | B2 | * | 4/2006  | Kaku | ............................ 711/115 |
| 7,433,245 | B2 | * | 10/2008 | Otsuka et al. | .......... 365/189.011 |
| 7,479,992 | B2 | * | 1/2009  | Miki | ........................... 348/231.1 |
| 8,314,855 | B2 | * | 11/2012 | Matsushima et al. | ...... 348/231.3 |
| 2004/0263644 | A1 | * | 12/2004 | Ebi | .............................. 348/231.2 |
| 2004/0264933 | A1 | * | 12/2004 | Uno | ................................ 386/95 |
| 2006/0050321 | A1 | * | 3/2006  | Takahashi | ....................... 358/296 |
| 2008/0080323 | A1 |   | 4/2008  | Katsuo et al. | |
| 2008/0199145 | A1 | * | 8/2008  | Morimoto et al. | ............... 386/52 |
| 2009/0213485 | A1 | * | 8/2009  | Matsushima et al. | ........... 360/69 |

FOREIGN PATENT DOCUMENTS

| JP | 2005-080056 | 3/2005 |
| JP | 2007-013314 | 1/2007 |
| JP | 2008-090915 | 4/2008 |
| JP | 4238448     | 3/2009 |
| JP | 2009-159314 | 7/2009 |
| JP | 2009-206652 | 9/2009 |

* cited by examiner

*Primary Examiner* — Ngoc-Yen Vu
*Assistant Examiner* — Ahmed A Berhan
(74) *Attorney, Agent, or Firm* — Panasonic Patent Center

(57) ABSTRACT

An imaging apparatus includes an information acquiring unit operable to acquire information representing a state of a recoding medium from the recording medium, a determining unit operable to determine the state of the recording medium based on the information acquired by the information acquiring unit, and an informing unit operable to inform result of the determination by the determining unit to an outside of the imaging apparatus.

16 Claims, 6 Drawing Sheets

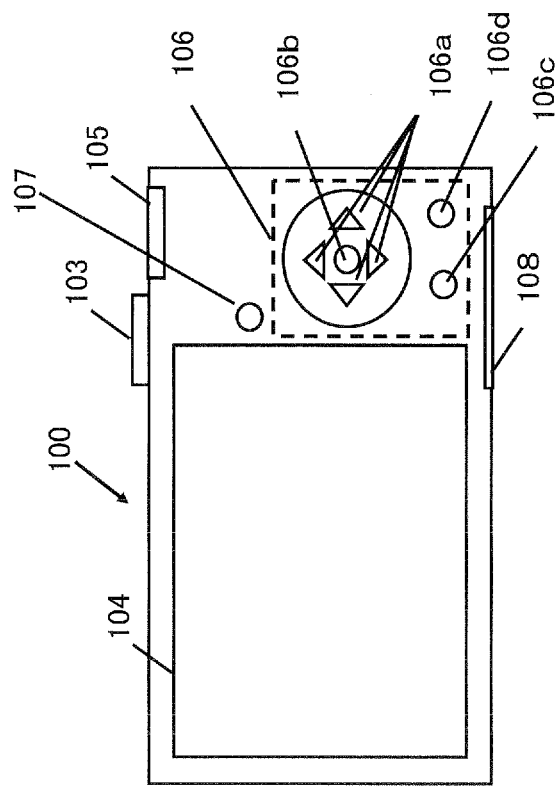
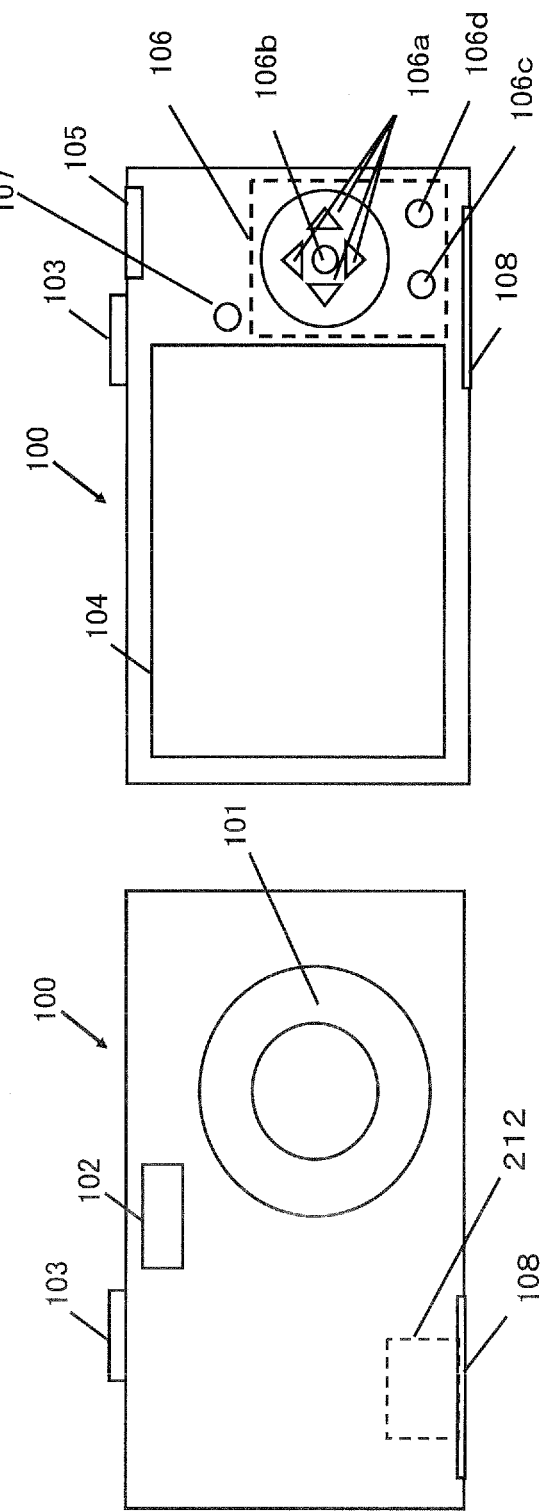

IMAGING APPARATUS, INFORMATION PROCESSING APPARATUS AND INFORMATION PROCESSING METHOD

BACKGROUND

1. Technical Field

The technical field relates to an imaging apparatus and an information processing apparatus capable of informing a user of a state of a recording medium.

2. Related Art

An image recording device such as a digital camera can record data of a shot still image and a moving image on a removable recording medium such as SD card. For example, various types of image data, such as a still image of a JPEG (Joint Photographic Experts Group) format and a moving image of an MPEG (Moving Picture Experts Group) format can be recorded on a recording medium. The image recording device can reproduce the image data recorded on the recording medium.

Such an image recording device is usually provided with an access lamp such as a LED to inform a user of a state that data is read/written from/to a recording medium when the recording medium is inserted to the image recording device. For example, Japanese Patent No. 4238448 discloses a technique, using an information presenting unit such as an access lamp, to inform a user of a type of communication between an image recording device such as a digital camera and a recording medium when the recording medium is inserted in the image recording device.

Conventionally, there are two types of image recording devices, including an image recording device capable of recording a moving image according to AVCHD (Advanced Video Codec High Definition) format on an SD card and an image recording device capable of recording a still image according to DCF (Design Rule for Camera File System) format on an SD card. Under such a circumstance, data including moving image data and still image data that are recorded in different formats are possibly recorded together on one SD card. This is true for an image recording device capable of recording both moving image and still image.

In such a case, in order to confirm whether a moving image is recorded on an SD card, the user should insert the SD card into a reproducing device or the like to confirm a file configuration in the SD card. This causes the user to do complicated works. By the arrangement disclosed in Japanese Patent No. 4238448, it is possible to confirm how communication is performed between the image recording device and a recording medium based on a lighting state of the access lamp. However, Japanese Patent No. 4238448 does not disclose an arrangement which enables easy determination as to whether or not moving image data is recorded in a recording medium.

To solve the above problem, an imaging apparatus and an image processing apparatus is provided for enabling easy confirmation of a state of a recording medium (a setting state, a data storage state, and the like) such as presence or absence of moving image data without user's special operation.

SUMMARY

In a first aspect, an imaging apparatus is provided, which includes an information acquiring unit operable to acquire information representing a state of a recoding medium from the recording medium, a determining unit operable to determine the state of the recording medium based on the information acquired by information acquiring unit, and a informing unit operable to inform result of the determination by the determining unit to an outside of the imaging apparatus.

In a second aspect, an information processing apparatus is provided, which includes an information acquiring unit operable to acquire information representing a state of a recoding medium from the recording medium, a determining unit operable to determine the state of the recording medium based on the information acquired by the information acquiring unit, and a informing unit operable to inform result of the determination by the determining unit to an outside of the information processing apparatus.

In a third aspect, an information processing method is provided, which includes acquiring information representing a state of a recoding medium from the recording medium, determining the state of the recording medium based on the acquired information; and informing the result of the determining to an outside.

According to the above aspects, the state of a recording medium (a setting state, a data storage state, and the like) such as presence or absence of moving images in the recording medium can be easily acquired without a user's special operation.

BRIEF DESCRIPTION OF DRAWINGS

FIGS. 1A and 1B are appearance views illustrating a digital camera according to an embodiment.

DETAILED DESCRIPTION OF PREFERRED EMBODIMENTS

Figure 2:
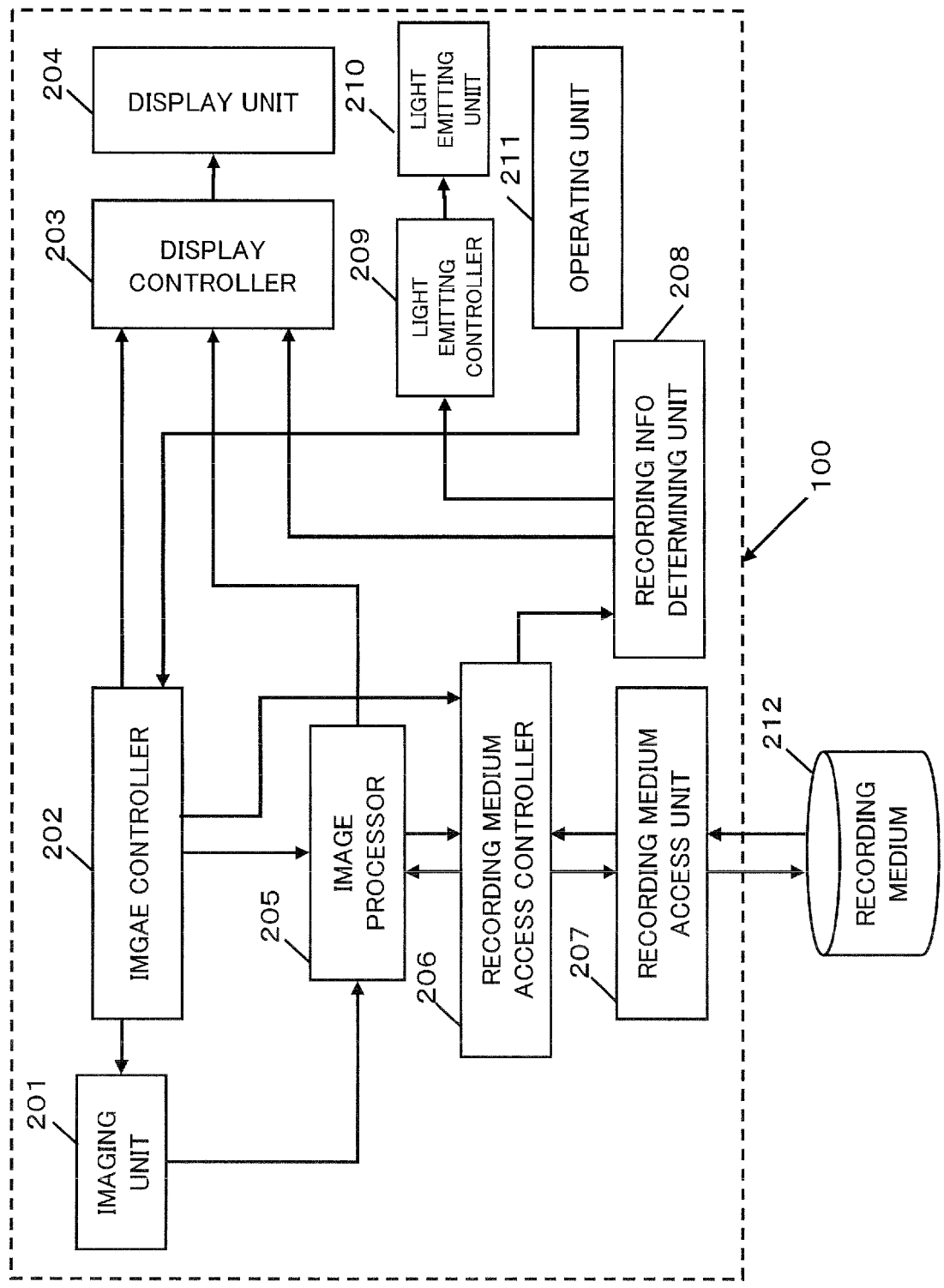
FIG. 2 is an internal block diagram illustrating the digital camera according to the embodiment.

Preferred embodiments will be described below with reference to the drawings.

First Embodiment

1. Configuration of Digital Camera 1.1 Appearance of the Digital Camera

FIGS. 1A and 1B are diagrams illustrating appearance of a digital camera according to an embodiment. FIG. 1A is a front view, and FIG. 1B is a rear view. A digital camera 100 according to the embodiment can record a moving image according to AVCHD (Advanced Video Codec High Definition) standard (hereinafter, it is just called "moving image"), and a still image (hereinafter, it is just called "still image") according to DCF (Design Rule for Camera File System) standard. The digital camera 100 has various operating modes (a still image recording mode, a moving image recording mode, and a playback mode). Details of the operating modes will be described later.

As shown in FIG. 1A, an imaging optical system 101 and a flash 102 are arranged on a front surface of the digital camera 100. The imaging optical system 101 images a subject image on an imaging device in the digital camera 100. The flash 102 emits a flash light so as to compensate a shortage of a light amount for taking a picture in a dark place with the still image recording mode.

A shutter button 103 is arranged on an upper surface of the digital camera 100. When the shutter button 103 is pressed in the still image recording mode, image data based on the subject image imaged on the imaging device is recorded as a still image file in a recording medium such as a memory card. Further, when the shutter button 103 is pressed in the moving image recording mode, image data based on the subject image imaged on the imaging device is sequentially recorded as a moving image file in the recording medium. When the shutter button 103 is pressed again, the recording of the moving image file is ended.

A slot 108 to which the recording medium is inserted is arranged on a lower surface of the digital camera 100. When the recording medium is inserted to the slot 108, shot data is recorded as an image file on the recording medium in the still image recording mode or the moving image recording mode. That is, when an image is recorded by using the digital camera 100, a still imaging and a moving image are possibly recorded together in the recording medium. Further, the digital camera 100 can display (play back) a still mage based on the still image file recorded on the recording medium and a moving image based on the moving image file recorded on the recording medium on a liquid crystal display monitor 104 in the playback mode.

As shown in FIG. 1B, the liquid crystal display monitor 104, a mode dial 105, and various operation buttons 106 are arranged on a rear surface of the digital camera 100. When an image based on a subject image imaged on the imaging device is displayed on the liquid crystal display monitor 104 at the time of the still image recording mode or the moving image recording mode. As a result, a user can decide a composition for shooting while confirming the image displayed on the liquid crystal display monitor 104. Further, the liquid crystal display monitor 104 can display the still image based on the still image file and the moving image based on the moving image file recorded on the recording medium during the playback mode.

The mode dial 105 is a dial type switch for switching the operating mode. By operating the mode dial 105, the user can decide the operating mode of the digital camera 100. The operating mode of the digital camera 100 includes the still image recording mode, the moving image recording mode, and the playback mode. The still image recording mode is an operating mode for recording image data based on the subject image imaged on the imaging device as a still image file in a recording medium by means of pressing-down of the shutter button 103. The still image recording mode is further divided into a fully automatic recording mode, a program recording mode, a shutter speed priority recording mode, an aperture priority recording mode, and a scene-by-scene recording mode. The moving image recording mode is an operating mode for sequentially recording image data based on the subject image imaged on the imaging device as a moving image file in the recording medium from pressing of the shutter button 103 to re-pressing of the shutter button 103.

The playback mode is an operating mode for displaying (playing back) a still image and a moving image based on the still image file and the moving image file recorded on the recording medium on the liquid crystal display monitor 104. In the playback mode, a thumbnail image of the still image file and a thumbnail image showing a representative image of the moving image file can be displayed on the liquid crystal display monitor 104, while being arranged together in time series. When the thumbnail image displayed on the liquid crystal display monitor 104 is selected, the display can be switched. When the thumbnail image of the sill image file is selected, the still image based on the still image file is displayed on the liquid crystal display monitor 104. When the thumbnail image showing the representative image of the moving image file is selected, the moving image based on the moving image file is played back.

The various operating buttons 106 include a menu button 106b, an up/down/right/left buttons 106a, a decision button 106b (serves also as the menu button), a display switching button 106c, and a delete button 106d. The menu button 106b is for displaying a menu screen on the liquid crystal display monitor 104. The up/down/right/left buttons 106a are for moving a cursor up, down, right and left in order to select an item on the menu screen. The decision button 106b is for instructing a decision of the item indicated by the cursor on the menu screen. The display switching button 106c is for switching items of OSD displayed on the liquid crystal display monitor 104. The delete button 106d is for instructing deletion of unnecessary still image and moving image. When these buttons are operated, more details can be set in the still image recording mode, the moving image recording mode, and the playback mode. That is, in the still image recording mode, exposure can be corrected, white balance can be adjusted, light emission of the flash 102 can be set. In the moving image recording mode, resolution and a frame rate can be changed. Further in the playback mode, a still image displayed on the liquid crystal display monitor 104 can be enlarged or reduced, a number of thumbnail images to be displayed simultaneously on the liquid crystal display monitor 104 can be set, and a still image file and a moving image file recorded in a recording medium can be retrieved.

An access lamp 107 is arranged on the rear surface of the digital camera 100. The access lamp 107 lights up and blinks so as to be capable of informing a predetermined state of the recording medium to the user or warning the user of the state.

1.2 Functional Block of the Digital Camera

FIG. 2 is a functional block diagram illustrating the digital camera 100 according to the embodiment.

The digital camera 100 according to the embodiment uses an SD card as a recording medium 212. The recoding medium is not limited to the SD card, and a hard disk, a DVD, a BD (Blu-ray disc), or the like can be used as long as data can be recorded therein.

An operating unit 211 includes the shutter button 103, the various operating buttons 106, and the mode dial 105 shown in FIGS. 1A and 1B, and provides user's instructions to an image controller 202 through them.

The image controller 202 controls an imaging unit 201, an image processor 205, a display controller 203, a light emitting controller 209, and a recording medium access controller 206 according to user's instructions through the operating unit 211 to perform shooting, recording, reproducing, and the like.

A display unit 204 is a display device such as LCD, and displays image data based on a subject image imaged on the imaging device, playback image of a still image and a moving image recorded in the recording medium, and a menu screen for performing the setting about the shooting and the playback. The display controller 203 is a unit for controlling the display of the display unit 204. The display unit 204 corresponds to the liquid crystal display monitor 104 of FIG. 1B.

The light emitting unit 210 is a lighting device such as LED, and corresponds to the access lamp 107 of FIG. 1B. The light emitting controller 209 instructs the light emitting unit 210 about lighting time, lighting interval, and lighting color so as to control the lighting-up operation of the light emitting unit 210.

The imaging unit 201 is an imaging device such as CCD, and converts an optical signal received via the optical system into an electric signal according to an instruction from the image controller 202 so as to output the electric signal to the image processor 205.

The image processor 205 performs compressing conversion such as JPEG compression on image data inputted from the imaging unit 201, and outputs the compressed data to the recording medium access controller 206. The image processor 205 converts the electric signal of the image inputted from the imaging unit 201 into a signal of a format displayable on the display unit 204, such as an YC signal, and outputs it to the display controller 203. The image processor 205 further expands the compressed data in the recording medium 212 inputted from the recording medium access controller 206, and outputs the expanded data to the display controller 203.

A recording medium access unit 207 is a slot having an interface for the recording medium 212, and reads/writes data from/to the recording medium 212.

The recording medium access controller 206 controls the recording medium access unit 207, and records the compressed data inputted from the image processor 205 in the recording medium 212. The recording medium access controller 206 further controls the recording medium. access unit 207 according to an instruction from the image controller 202 so as to read the compressed data from the recording medium 212 and output the read data to the image processor 205. The recording medium access controller 206 further controls the recording medium access unit 207 so as to read a directory/file configuration in the recording medium 212 and output it to a recording information determining unit 208.

The recording information determining unit 208 analyzes the directory/file configuration inputted from the recording medium access controller 206, and determines whether at least one moving image file is recorded in the recording medium 212. When it is determined that at least one moving image file is recorded, the recording information determining unit 208 instructs the light emitting controller 209 to control the light emitting unit 210 to blink with blue light. When it is determined that a moving image file is not recorded, the recording information determining unit 208 instructs the light emitting controller 209 to control the light emitting unit 210 to blink with red light.

The functions of the image controller 202, the display controller 203, the image processor 205, the recording medium access controller 206, the recording information determining unit 208, and the light emitting controller 209 may be realized by a hard-wired electronic circuit, or may be realized by a program executed by a computer.

2. Operation for Informing Presence or Absence of Moving Image File

Figure 3:
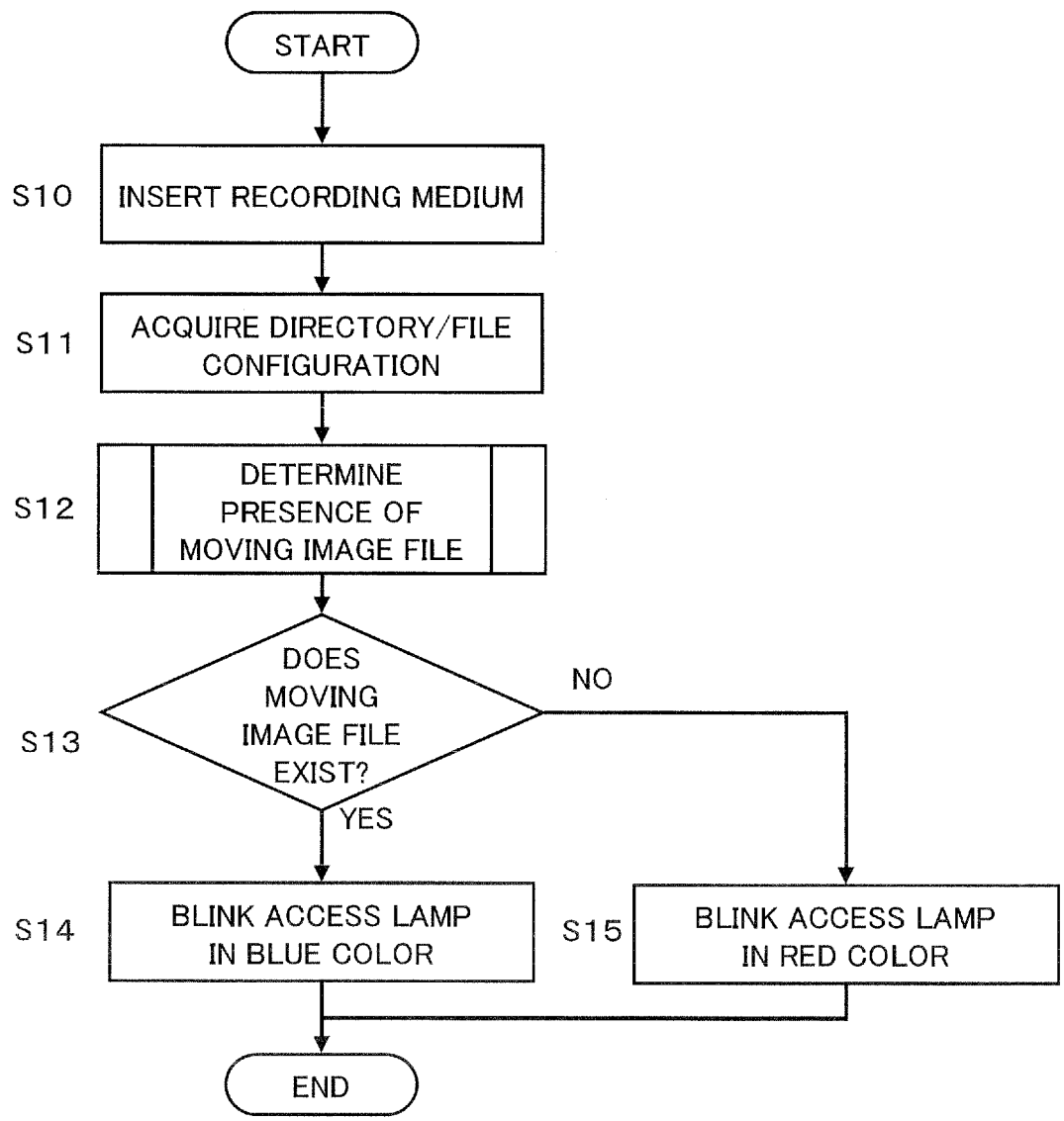
FIG. 3 is a flowchart illustrating an operation for informing presence or absence of a moving image file in a recording medium according to a first embodiment.

An operation for informing the presence or absence of the moving image file in the recording medium 212 when the recording medium 212 is inserted to the digital camera 100 according to the embodiment will be described with reference to a flowchart of FIG. 3.

When the recording medium 212 is inserted to the slot 108 of the digital camera 100 (S10), the recording medium access controller 206 instructs the recording medium access unit 207 to read the directory/file configuration for directories and/or files under a root directory in the recording medium 212 (S11).

The recording information determining unit 208 analyzes the directory/file configuration in the recording medium 212 acquired by the recording medium access controller 206, and determines whether at least one moving image file is present in the recording medium 212 (S12). Details of this determining process will be described later. The recording information determining unit 208 outputs a determined result to the light emitting controller 209.

The light emitting controller 209 receives the determined result obtained from the recording information determining unit 208. If it is determined that at least one moving image file is present in the recording medium 212 (YES in S13), the light emitting controller 209 instructs the light emitting unit 210 to blink with blue light (S14). On the other hand, if it is determined that a moving image is not present (NO in S13), the light emitting controller 209 instructs the light emitting unit 210 to blink with red light (S15). The light emitting unit 210 performs the blink operation in response to the instruction from the light emitting controller 209 (S14/S15).

As described above, the digital camera 100 according to the embodiment can determine the presence or absence of the moving image file in the recording medium 212 and inform the user of the result of the determination only by means of the analyzing process for the directory/file configuration without analyzing data in the file. As a result, only by inserting the recording medium 212 into the digital camera, the user can easily confirms the presence or absence of the moving image file in the recording medium 212 through a lighting color of the light emitting unit 210 without playing back the image data and visually confirming it through the liquid crystal display monitor 104.

In the embodiment, the presence or absence of the moving image file in the recording medium 212 is confirmed by a lighting color of the light emitting unit 210, but the embodiment is not limited to this. For example, a blinking cycle of the light emitting unit 210 may be varied according to the presence or absence of the moving image file in the recording medium 212. For example, when the recording information determining unit 208 determines that at least one moving image file is present in the recording medium 212 (YES in S13), the light emitting unit 210 may blink in a short cycle. When the moving image file is not present (NO in S13), the light emitting unit 210 may blink in a long cycle.

The presence or absence of the moving image file in the recording medium 212 may be informed by lighting-up and lighting-out of the light emitting unit 210. For example, if the recording information determining unit 208 determines that at least one moving image file is present in the recording medium 212 (YES in S13), the light emitting unit 210 may be controlled to light up, and if the moving image file is not present (NO in S13), the light emitting unit 210 may be prevented from lighting up.

The lighting-up and lighting-out of the light emitting unit 210 can be considered as a case where the blinking cycle of the light emitting unit 210 is infinite in a broad sense. When the presence or absence of moving image in the recording medium 212 is informed by the blinking cycle of the light emitting unit 210 or by switching between the lighting-up and lighting-out of the light emitting unit 210, the idea of this embodiment can be applied even to an inexpensive light emitting unit that cannot change the lighting color. Further, when two light emitting units are provided, the presence or absence of a moving image in the recording medium 212 may be informed by switching and lighting the emitting unit.

2.1 Process for Determining Presence or Absence of Moving Image File

A process for determining the presence or absence of the moving image file in the recording medium 212 by the recording information determining unit 208 (step S12 in FIG. 3) will be described below.

Figure 4:
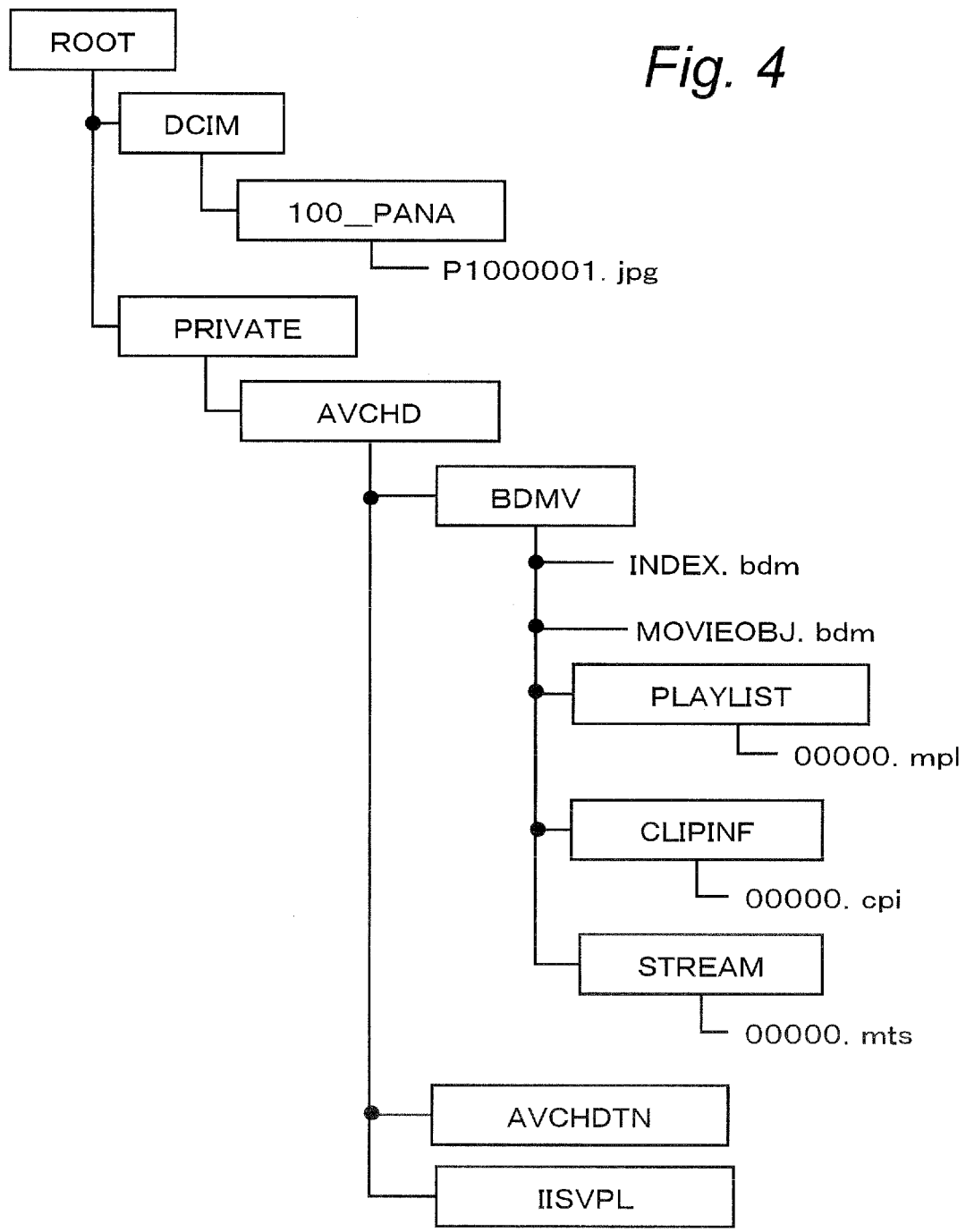
FIG. 4 is a diagram describing a configuration of directory and/or file (directory/file configuration) in the recording medium.

At first, the directory/file configuration of the recording medium 212 will be described. FIG. 4 illustrates one example of the directory/file configuration in the case where moving image data is recorded on the recording medium 212. 100_PANA directory under the ROOT directory is a directory where a still image file is recorded according to the DCF standard. Further, PRIVATE directory under the ROOT directory is a directory created according to SD standard. AVCHD directory under the PRIVATE directory and directories thereunder are directories created according to AVCHD standard. That is, when at least one moving image file is recorded in the recording medium 212 according to the AVCHD standard, the AVCHD directory is necessarily present. For this reason, the presence of the moving image file can be estimated by confirming the presence of the AVCHD directory.

Figure 5:
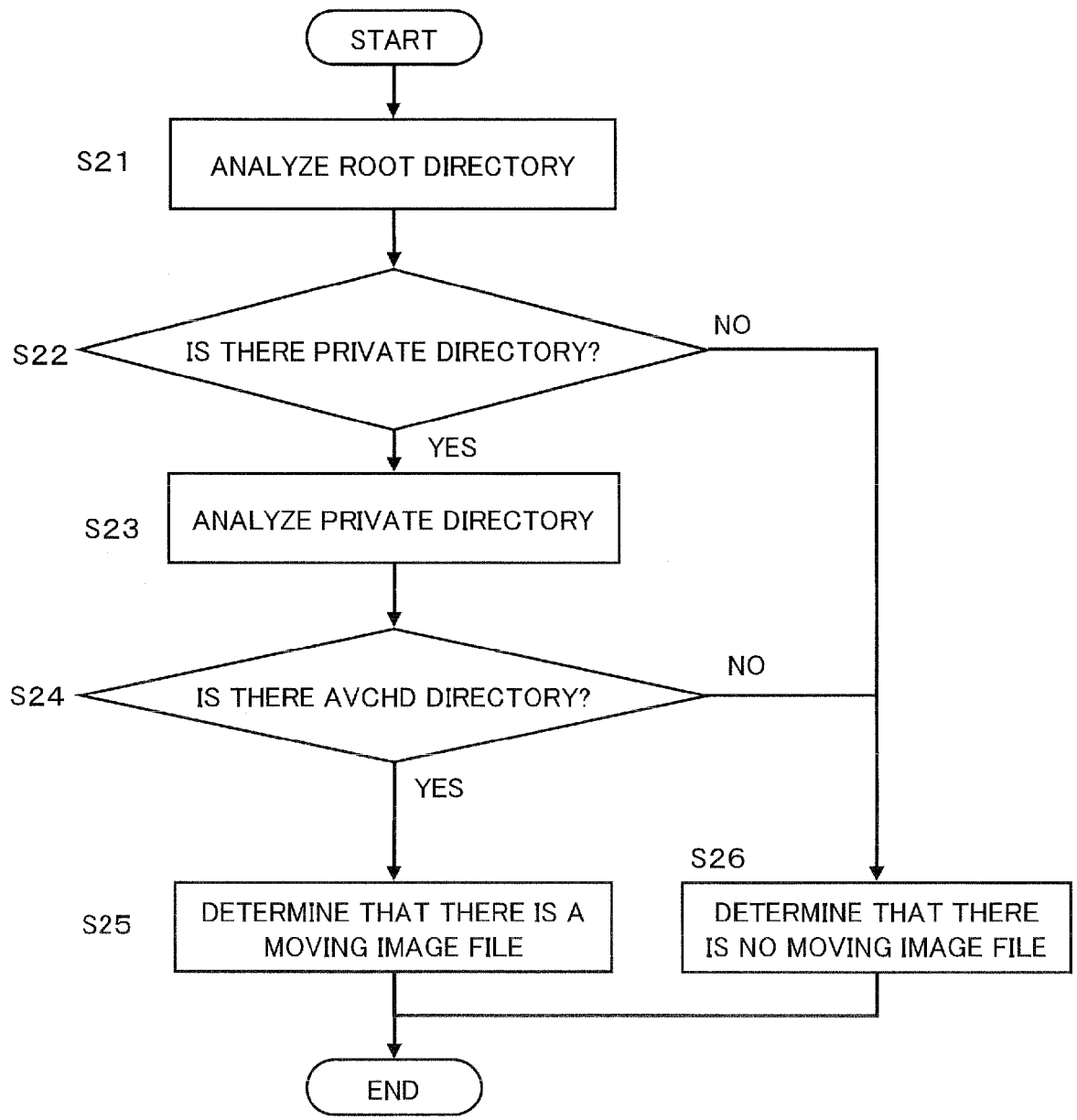
FIG. 5 is a flowchart illustrating a process for determining presence or absence of a moving image file in the recording medium according to the first embodiment.

A process for determining the presence or absence of the moving image file in the recording medium 212 (step S12 in FIG. 3) will be described with reference to a flowchart of FIG. 5.

The recording information determining unit 208 analyzes the directory composition acquired by the recording medium access controller 206 (S21). Concretely, the recording information determining unit 208 analyzes information about the directories under the root directory, and determines whether or not a PRIVATE directory is present (S22). If the PRIVATE directory is not present (NO in S22), the recording information determining unit 208 determines that no moving image file is present in the recording medium 212 (S26), and ends the process for determining the presence or absence of the moving image file.

If the PRIVATE directory is present (YES in S22), the recording information determining unit 208 analyzes the PRIVATE directory (S23) so as to determine whether or not an AVCHD directory is present in the PRIVATE directory (S24). If the AVCHD directory is present in the PRIVATE directory (YES in S24), the recording information determining unit 208 determines that at least one moving image file is present in the recording medium 212 (S25), and ends the process for determining the presence or absence of the moving image file. If the AVCHD directory is not present in the PRIVATE directory (NO in S24), the recording information determining unit 208 determines that a moving image file is not present in the recording medium 212 (S26) and ends the process for determining the presence or absence of the moving image file.

As described above, in the embodiment, in order to determine the presence or absence of a moving image file in the recording medium 212, the presence of a directory specific to the standard is confirmed so that a high-speed determination is enabled.

3. Modified Example

In the first embodiment, it is determined that at least one moving image file is present in the recording medium 212 when both the PRIVATE directory and the AVCHD directory are present in the recording medium 212. However, the determination of the presence or absence of the moving image file is not limited to this method. For example, presence or absence of other directories and/or files defined by the AVCHD standard may be confirmed to determine the presence or absence of a moving image file. For example, when at least one of a BDMV directory, a BDMV/STREAM directory, a BDMV/PLAYLIST directory, and a BDMV/CLIPINF directory is present under the AVCHD directory, it may be determined that at least one moving image file is recorded on the recording medium 212. In another manner, when a predetermined file (*.bdm, *.mp, *.cpi, *.mts) is present in at least one of the BDMV, BDMV/STREAM, BDMV/PLAYLIST and BDMV/CLIPINF directories, the determination may be made that at least one moving image file is recorded in the recording medium 212. By confirming the presence of a file defined by the AVCHD standard, the presence or absence of the moving image file can be determined more accurately than the case of confirming presence of a directory.

The first embodiment describes the example of the method for analyzing the directory/file configuration in the case where the recording medium 212 is an SD card, but the method for analyzing the directory/file configuration may vary with the recording medium 212. For example, the AVCHD directory may be present just under the ROOT directory. When the recording medium is other than an SD card, it can be determined whether or not the AVCHD directory is present in a path defined by the standard of the recording medium to determine the presence or absence of a moving image file.

It goes without saying that the idea of this embodiment can be applied even to a directory/file configuration conforming to standards other than the AVCHD standards as long as the directory/file configuration is known. In the process for determining the presence or absence of a moving image file in the recording information determining unit 208, the directory/file configuration may be analyzed with a plurality of standards being taken into consideration. That is, firstly, the directory/file configuration is analyzed according to the directory/file configuration conforming to a first standard, and then the directory/file configuration may be sequentially analyzed according to directory/file configurations conforming to second and third standards. In such a manner, the presence or absence of a moving image can be determined surely in a recording medium having directory/file configuration conforming to any standards.

Even for a directory/file configuration that does not conform to any standards, a file name may be analyzed to determine the presence or absence of a moving image file. Particularly, it can be determined whether a file is a moving image file or another type of file based on an extension of the file name (for example, *.mts). In such a manner, even in the directory/file configuration that does not conform to any standards, the presence or absence of a moving image file can be determined surely.

Second Embodiment

In the first embodiment, the presence or absence of a moving image file is informed as the state in the recording medium 212 to be informed to the user. However, information to be informed is not limited to this. Other information may be informed as long as the information is about the state of a recording medium which the user cannot determine from an outside of the recording medium. For example, when the recording medium 212 is an SD card and is formatted by a personal computer (PC), a cluster size occasionally becomes smaller than the case where the format is executed by a digital camera. When the cluster size is small, the writing speed of data becomes slow. For this reason, it is desirable that the SD card is formatted in a suitable cluster size when the writing speed is demanded for recording of a moving image with HD (High Definition) size or the like. Therefore, it is useful, when the SD card is inserted, to confirm whether the cluster size or the like matches with a recommended value, and to inform the user of a state that the writing speed can be or cannot be ensured. In this embodiment, the determining process in such a case will be described. The configuration of the digital camera is similar to that in the first embodiment.

Figure 6:
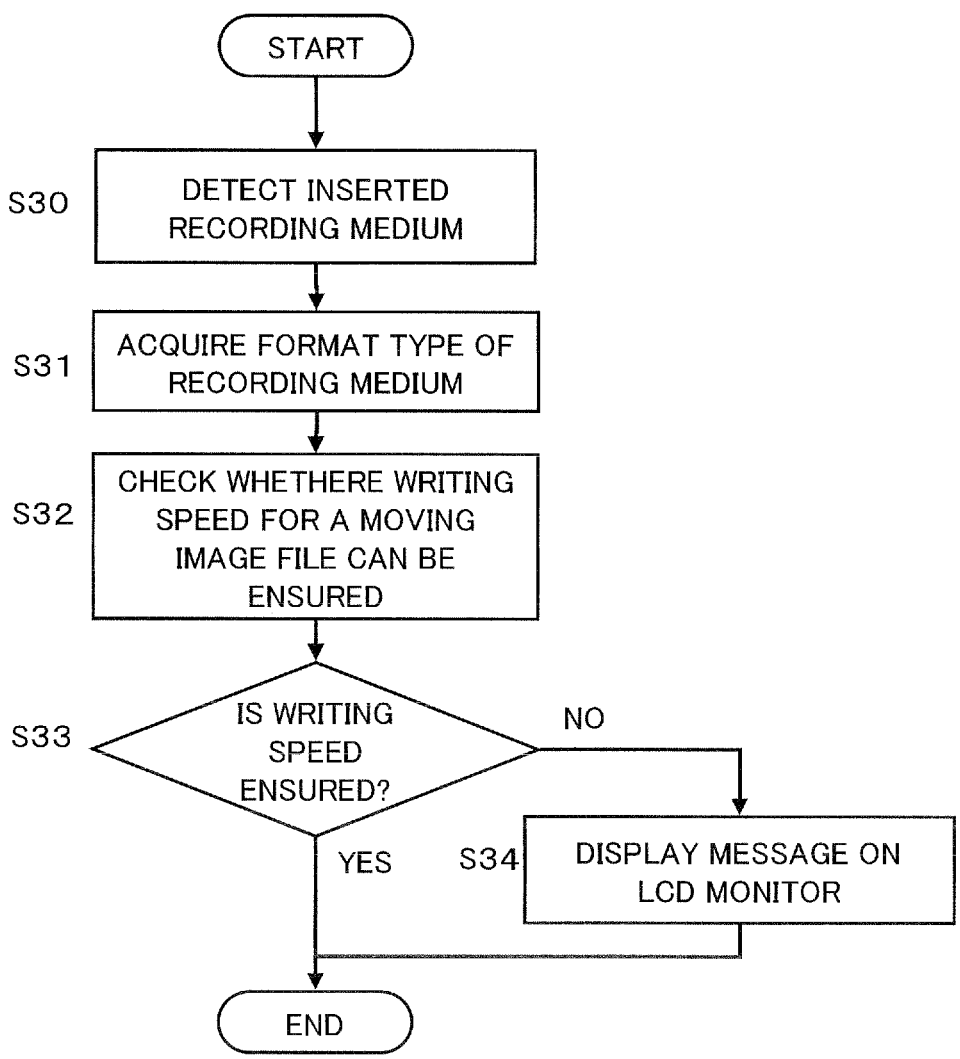
FIG. 6 is a flowchart illustrating an operation for informing warranty of a writing speed of a recording medium according to a second embodiment.

FIG. 6 is a flowchart illustrating the process for determining the state of the recording medium according to the embodiment. In FIG. 6, if the recording medium 212 is inserted to the slot 108 of the digital camera 100 (S30), the recording medium access controller 206 instructs the recording medium access unit 207 to acquire a format type of the recording medium 212 (S31). Concretely, information about a file system of the recording medium 212 is acquired.

The recording information determining unit 208 analyzes the format type of the recording medium 212 based on the information acquired by the recording medium access controller 206, and determines whether or not the writing speed of the inserted recording medium 212 can be ensured (S32). Concretely, the recording information determining unit 208 refers to information representing a cluster size (minimum recording unit) included in the file system information, and determines whether or not the cluster size of the inserted recording medium 212 is a predetermined cluster size (recommended cluster size of the SD standard).

When the cluster size of the inserted recording medium 212 is the predetermined cluster size, the recording information determining unit 208 determines that the writing speed of the inserted recording medium 212 can be ensured (high-speed writing is possible). If not, the recording information determining unit 208 determines that the writing speed cannot be ensured (high-speed writing is impossible). Then the recording information determining unit 208 transmits the determined result to the display controller 203.

The recommended cluster size of the SD standards is disclosed in "SD Specifications Part 2, File System Specification, Version 2.00" published by SD Association. In the embodiment, the format type of the SD card is confirmed by confirming the cluster size, but the method is not limited to this, and any method can be used as long as a condition for ensuring the writing speed is satisfied.

If it is determined that the writing speed of the inserted recording medium 212 cannot be ensured (NO in step S33), the display controller 203 displays a message that "This card is not suitable for recording moving images" on the display unit 204 (S34). In this example, if it is determined that the writing speed of the inserted recording medium 212 can be ensured (YES in S33), the display controller 203 does not display any message, but it may display a message indicating that the inserted recording medium 212 is suitable for recording moving images. The method for informing the user of the message that the writing speed cannot be ensured is not limited to the above method. For example, the message may be informed by lighting up the access lamp 107 like the first embodiment.

In the above arrangement, the user can easily recognize whether or not the recording medium is suitable for recording moving images without analyzing the inside of the recording medium 212.

Other Embodiments

In the above embodiments, the light emitting unit 210 is used as a unit for informing the user of information, but the informing unit is not limited to this and any unit that can inform the user of a difference in internal states of the recording medium 212 can be used. For example in the first embodiment, the message such that "At least one AVCHD moving image is recorded on this SD card" may be displayed on the display device 202 through the display controller 203. Further, instead of messages, icons or marks whose shapes and/or colors vary with the internal state of the recording medium 212 may be displayed on the display device 202. Further, a sound generating unit may be provided so as to inform a difference in the internal state of the recording medium 212 using different voices or signal sounds.

In the above embodiments, when the recording medium 212 is inserted into the slot 108, the state of the recording medium is informed, but the informing timing is not limited to this. The above informing operation may be performed at the time of starting the shooting of a moving image, switching to the moving image recording mode, or powering on the digital camera 100.

In addition to the presence or absence of a moving image file and the format of the recording medium, the following states may be determined and informed according to the determined result:

whether or not a number of defective sectors is not less than a predetermined number; and whether or not a free area is not less than a predetermined value.

That is, based on the information about the recording medium, the state of the recording medium may be determined, and the determined result may be informed.

In the above description, the digital camera is used as one example of the embodiments, but the idea of the above embodiments is not limited to the application to the digital camera. The idea of the embodiments can be applied to an imaging apparatus that can record image data into removable recording medium and can play back the image data recorded on the recording medium, such as a digital video camera and a mobile terminal with a camera, and information processing apparatuses, such as a personal computer and a photo viewer.

Industrial Applicability

The embodiment enables the user to know easily the state of a recording medium (a setting state, a data storage state and the like), such as the presence or absence of a moving image in the recording medium and its format, without a user's special operation. Thus the embodiment is useful for an imaging apparatus, such as a digital camera and a digital video camera, and an information processing apparatus using the recording medium, such as a personal computer.

What is claimed is:

1. An imaging apparatus comprising:
a medium detecting unit operable to detect insertion of a recording medium to the imaging apparatus;
an information acquiring unit operable to acquire information relating to a directory configuration of the recording medium from the recording medium;
a determining unit operable to determine a state of the recording medium based on the information acquired by the information acquiring unit when the insertion of the recording medium is detected by the medium detecting unit; and
an informing unit operable to inform a result of the determination by the determining unit to an outside of the imaging apparatus, wherein
the determining unit, in order to determine the state of the recording medium, determines only whether or not a specific directory, which is a topmost directory in directories defined according to an advanced video codec high definition (AVCHD) standard, is present in the recording medium based on the acquired information;
when determining that the specific directory is present in the recording medium, the determining unit determines, as the state of the recording medium, that at least one moving image file is recorded on the recording medium, and
when determining that the specific directory is not present in the recording medium, the determining unit determines, as the state of the recording medium, that a moving image file is not recorded on the recording medium.

2. The imaging apparatus according to claim 1, wherein:
the information acquiring unit operable to acquire information representing a cluster size included in file system information from the recording medium;
the determining unit operable to determine whether or not high speed writing to the recording medium is possible based on whether the information representing the cluster size acquired by the information acquiring unit is a recommended cluster size of the recording medium when the insertion of the recording medium is detected by the medium detecting unit; and when the information representing the cluster size acquired by the information acquiring unit is the recommended cluster size of the recording medium, the determining unit determines that the high-speed recording to the recording medium is possible, and when the information representing the cluster size acquired by the information acquiring unit is not the recommended cluster size of the recording medium, the determining unit determines that the high-speed recording to the recording medium is not possible.

3. The imaging apparatus according to claim 2, wherein the recording medium is an SD card, and the recommended cluster size of the recording medium is a recommend cluster size of the SD standard.

4. The imaging apparatus according to claim 2, wherein the informing unit includes a light emitting unit, which emits light with color varying with the determined result.

5. The imaging apparatus according to claim 2, wherein the informing unit includes a light emitting unit, which blinks in a cycle varying with the determined result.

6. The imaging apparatus according to claim 2, wherein the informing unit includes a plurality of light emitting units, and the light emitting unit to be lit up is switched according to the determined result.

7. The imaging apparatus according to claim 2, wherein the informing unit includes a display unit for displaying predetermined text or image.

8. The imaging apparatus according to claim 2, wherein the informing unit includes a sound generating unit for outputting a voice or signal sound.

9. The imaging apparatus according to claim 1, wherein: the information acquiring unit operable to acquire information representing a cluster size included in file system information from the recording medium;

the determining unit operable to determine whether or not high speed writing to the recording medium is possible based on the information representing the cluster size acquired by the information acquiring unit is a recommended cluster size of the recording medium when the insertion of the recording medium is detected by the medium detecting unit.

10. An information processing apparatus, comprising: a medium detecting unit operable to detect insertion of a recording medium to the information processing apparatus;

an information acquiring unit operable to acquire information relating to a directory configuration of the recording medium from the recording medium;

a determining unit operable to determine a state of the recording medium based on the information acquired by the information acquiring unit when the insertion of the recording medium is detected by the medium detecting unit; and an informing unit operable to inform a result of the determination by the determining unit to an outside of the information processing apparatus, wherein the determining unit, in order to determine the state of the recording medium, determines only whether or not a specific directory, which is a topmost directory in directories defined according to an advanced video codec high definition (AVCHD) standard, is present in the recording medium based on the acquired information;

when determining that the specific directory is present in the recording medium, the determining unit determines that at least one moving image file is recorded on the recording medium, as the state of the recording medium, and when determining that the specific directory is not present in the recording medium, the determining unit determines that a moving image is not recorded on the recording medium, as the state of the recording medium.

11. The information processing apparatus according to claim 10, wherein the informing unit includes a light emitting unit, which emits light with color varying with the determined result.

12. The information processing apparatus according to claim 10, wherein the informing unit includes a light emitting unit, which blinks in a cycle varying with the determined result.

13. The information processing apparatus according to claim 10, wherein the informing unit includes a display unit for displaying predetermined text or image.

14. The information processing apparatus according to claim 10, wherein the informing unit includes a sound generating unit for outputting a voice or signal sound.

15. An information processing method for causing an information processing apparatus to execute predetermined procedures including the procedures of:

detecting insertion of a recording medium to the information processing apparatus; acquiring information relating to a directory configuration of the recording medium from the recording medium;

determining a state of the recording medium based on the acquired information when the insertion of the recording medium is detected by the medium detecting unit; and informing the determined result to an outside of the information processing apparatus, wherein the determining procedure, in order to determine the state of the recording medium, only determines whether or not a specific directory, which is a topmost directory in directories defined according to an advanced video codec high definition (AVCHD) standard, is present in the recording medium based on the acquired information;

when determining that the specific directory is present in the recording medium, the determining procedure determines, as the state of the recording medium, that at least one moving image file is recorded on the recording medium, and when determining that the specific directory is not present in the recording medium, the determining procedure determines, as the state of the recording medium, that a moving image file is not recorded on the recording medium.

16. The information processing method according to claim 15, wherein the predetermined procedures further include the procedures of:

acquiring information representing a cluster size included in file system information from the recording medium;

determining whether or not high speed writing to the recording medium is possible based on whether the acquired information representing the cluster size is a recommended cluster size of the recording medium when the insertion of the recording medium is detected; and informing the determined result to an outside of the information processing apparatus, wherein when the information representing the cluster size acquired by the information acquiring unit is the recommended cluster size of the recording medium, the determining procedure determines that the high-speed recording to the recording medium is possible, and when the information representing the cluster size acquired by the information acquiring unit is not the recommended cluster size of the recording medium, the determining procedure determines that the high-speed recording to the recording medium is not possible.

* * * * *